US007170429B2

(12) United States Patent
Koppich

(10) Patent No.: US 7,170,429 B2
(45) Date of Patent: Jan. 30, 2007

(54) KEYPAD INDICATING ARRANGEMENT INCLUDING VIRTUAL KEY

(75) Inventor: George Koppich, Irvine, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 484 days.

(21) Appl. No.: 10/099,643

(22) Filed: Mar. 15, 2002

(65) Prior Publication Data

US 2003/0174073 A1 Sep. 18, 2003

(51) Int. Cl.
*H03K 17/94* (2006.01)

(52) U.S. Cl. .......................... 341/23; 341/22; 345/168

(58) Field of Classification Search ............ 341/21–26; 455/90, 556–557, 569–575; 345/184, 168
See application file for complete search history.

(56) References Cited

U.S. PATENT DOCUMENTS 5,202,828 A 4/1993 Vertelney et al.
5,250,986 A 10/1993 Axten et al.
5,341,293 A 8/1994 Vertelney et al.
5,717,439 A 2/1998 Levine et al.
5,812,805 A 9/1998 Kitayama et al.
5,859,642 A 1/1999 Jones
5,880,727 A 3/1999 Barrett et al.
5,898,434 A 4/1999 Small et al.
5,984,502 A 11/1999 Calder
5,996,894 A * 12/1999 Yin et al. .............. 235/462.01
6,037,937 A 3/2000 Beaton et al.
6,098,073 A 8/2000 O—Rourke
6,111,573 A 8/2000 McComb et al.
6,118,450 A 9/2000 Proehl et al.
6,181,344 B1 1/2001 Tarpenning et al.
6,201,524 B1 3/2001 Aizawa
6,204,848 B1 3/2001 Nowlan et al.
6,208,342 B1 3/2001 Mugura et al.
6,243,088 B1 6/2001 McCormack et al.
6,256,020 B1 * 7/2001 Pabon et al. ................ 345/172
6,724,370 B2 * 4/2004 Dutta et al. ................. 345/169

* cited by examiner

*Primary Examiner*—Jeffery Hofsass
(74) *Attorney, Agent, or Firm*—Tucker Ellis & West LLP

(57) ABSTRACT

The present invention provides a keypad having a plurality of keys, each having a predetermined function for a respective plurality of selective operations. An indicating arrangement is provided for identifying a selected one of the plurality of keys. As a special feature of the present invention, the indicating arrangement can include one or more virtual keys, selectively programmable to emulate the predetermined function of one or more of the plurality of keys.

10 Claims, 1 Drawing Sheet

20

22

| K11 | K12 | K13 | K14 | K15 |
|---|---|---|---|---|
| K21 | K22 | K23 | K24 | K25 |
| K31 | K32 | K33 | K34 | K35 |
| K41 | K42 | K43 | K44 | K45 |

| K11 | K12 | K13 | K14 | K15 |
|---|---|---|---|---|
| K21 | K22 | K23 | K24 | K25 |
| K31 | K32 | K33 | K34 | K35 |
| K41 | K42 | K43 | K44 | K45 |

| K11 | K12 | K13 | K14 | K15 |
|---|---|---|---|---|
| K21 | K22 | K23 | K24 | K25 |
| K31 | K32 | K33 | K34 | K35 |
| K41 | K42 | K43 | K44 | K45 |

| Virtual Key | K12 | K13 | K14 | K15 |
|---|---|---|---|---|
| K21 | K22 | K23 | K24 | K25 |
| K31 | K32 | K33 | K34 | K35 |
| K41 | K42 | K43 | K44 | K45 |

| K11 ✸ | K12 | K13 | K14 | K15 |
|---|---|---|---|---|
| K21 | K22 | K23 | K24 | K25 |
| K31 | K32 | K33 | K34 | K35 |
| K41 | K42 | K43 | K44 | K45 |

KEYPAD INDICATING ARRANGEMENT INCLUDING VIRTUAL KEY

BACKGROUND OF THE INVENTION

The present invention is directed to the field of keypad interface control devices, particularly those of the type that have a large number of keys. Many types of devices are operated by keypad interfaces, which allow a plurality of functional operations to be selected. It is also common for devices to include a display, e.g. an LCD or LED or the like, for displaying the selected operation and/or current status of the operational state.

Many diverse types of devices employ keypad controls, from photocopiers to household appliances such as microwave ovens and dishwashers. Control systems for these devices continue to become more sophisticated and the array of features and functions become larger. Consequently, the complexity and size of the keypad can become increasingly greater, with a large number of specialized control keys. As shown in FIG. 1, a common-type keypad 10 can include as many as twenty keys 12 to provide a range of functions. It can therefore become very cumbersome and confusing for a user to navigate the keypad and locate a desired key.

On certain keypads, certain functional states are controlled by repeatedly depressing a single key, to trigger a specific operating mode of a particular function. For example, the vent on certain models and makes of microwave ovens is controlled via a "vent" key. Repeated actuation of the vent key allows a user to select a vent mode between: On/High Speed; On/Low Speed; and Vent Off. Perhaps a user turns on the vent and after a period of time wishes to change the vent mode to a lower speed or to turn it off. If the user returns after a period of time, the desired key must be located in order to select a different mode. This simple operation may be cumbersome and confusing if the keypad is cluttered with a large number of keys. Locating the current key may be a time consuming and frustrating experience. Also, an inadvertent selection of a wrong key may result in an operational error or other such problem.

SUMMARY OF THE INVENTION

In order to overcome the difficulties and drawbacks encountered with previous-type devices, the present invention provides a keypad having a plurality of keys, each having a predetermined function for a respective plurality of selective operations. An indicating arrangement is provided for identifying a selected one of the plurality of keys. As a special feature of the present invention, the indicating arrangement can include one or more virtual keys, selectively programmable to emulate the predetermined function of one or more of the plurality of keys.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

Figures 1, 2, 3, 4:
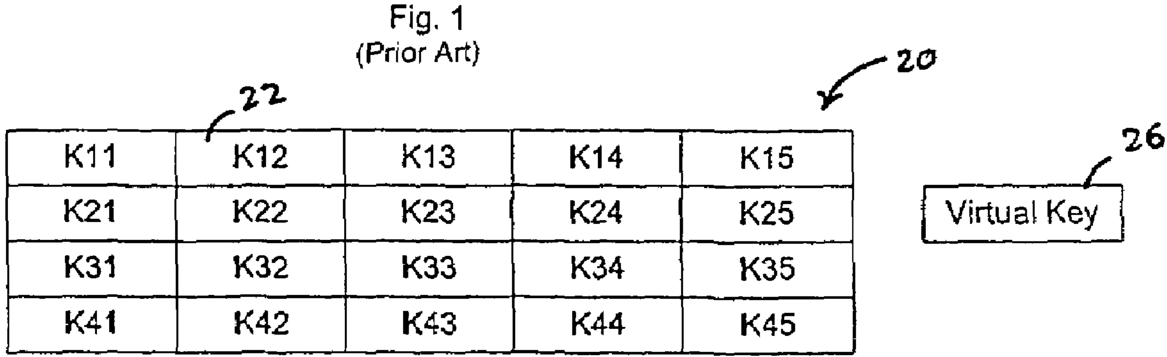
FIG. 1 shows an exemplary previous-type keypad with a large number of buttons.
FIG. 2 shows a keypad having a separate virtual key in accordance with the present invention.
FIG. 3 shows a keypad having a virtual key with a distinguishing indicating feature, in accordance with the present invention.
FIG. 4 shows a keypad having a distinguishing indicating feature for highlighting a selected key, in accordance with the present invention.

In the present invention, a keypad is provided having a plurality of keys, where each key has one or more specific functions for a respective plurality of selective operations. For example, each key can provide one or more operating modes for a specific device operation. In indicating arrangement in accordance with several embodiments of the invention is provided for identifying a selected one of the plurality of keys. In the preferred embodiment, the indicating arrangement is used to indicate an active operational state of the selected key.

An embodiment is shown in FIG. 4 in which a keypad 20 is provided with a plurality of keys 22. The indicating arrangement includes a color-producing implementation on the selected key 24, in order indicate which the last-selected key or a specific operational state governed by that key 24. In the preferred embodiment, the color-producing implementation is actuable so as to variably indicate the selected key 24. The color producing implementation can include an actual illumination element, which can be a backlighted illumination arrangement retained behind each key 27. Alternatively the entire keypad 20 can be backlighted and each key 22 can be selectively shuttered using an LCD arrangement. A full-color LCD can be used to selectively vary the color of selected key 24, to indicate a selected operating mode of the function indicated on the key. The illumination element can include a conventional bulb or an LED, disposed behind the keys 22 for backlighting, or on the surface of the keys 22. An LED can also include a multicolor LED, where a different color can be used for indicating each different selected operating mode.

In an alternative embodiment of the invention, the indicating arrangement can include a display for displaying indicia directly on the selected key 24. The display can include a portion or the entire area of each key 22, and be actuable in response to selection of a specific key. The indicia can include an icon or other pictographic symbol, and can also be illuminated or simply be visible with ambient lighting, e.g. the display can respectively include an LED or LCD. The display can also include an alphanumeric display for displaying words and/or numbers, e.g. a timer. In this manner, the invention not only facilitates the locating of a selected key, but can provide information regarding the operation of the selected function.

In another embodiment of the invention, as shown in FIGS. 2 and 3, the indicating arrangement includes one or more virtual keys 26, selectively programmable to emulate the function of the selected key 24. The virtual key 26 is a "soft key" in that its function is variable. The virtual key 26 would preferably provide the same functionality of the most recently selected key 24. However, the virtual key 26 can alternatively be programmed to retain the function of a commonly used key.

As shown in FIG. 2, the virtual key 26 can be mounted at a position displaced from the plurality of keys 22 on the keypad 20. Alternatively, as shown in FIG. 3, the virtual key 26 can be a specific key 22 on the keypad 20. In either of these embodiments, the indicating arrangement can further include an implementation for producing a visible distinction on one or both of the virtual key 26 and the selected key 24. This implementation can include a color-producing implementation as disclosed above in connection with the embodiments of FIG. 4. For example, these embodiments can include an actuable illumination element alone or in combination with an actuable display for displaying symbolic or alphanumeric characters. It may be desirable to highlight the virtual key 26 to indicate a name, symbol, or color of the selected key. Alternatively, it may be desired to similarly highlight the selected key 24. Also, both keys 24, 26 can be highlighted to display the same name, color or symbol, so as to greatly facilitate the locating and actuating of a desired function key.

In still another aspect of the invention, a plurality of virtual keys 26 can be provided, either displaced from the keypad 20 or as a part of the keypad 20. Each of these keys 26 could be selectively programmable to emulate the functions of a respective number of keys 22. Each of these virtual keys 26 can also include an implementation for producing a visible distinction between one or more virtual key and its respective counterpart selected key 24. For example, each virtual key 26 can be indicated by a different color or illumination level to indicate e.g. the last several selected keys 24. Also, a visible distinction can be created between one or more pairs of virtual keys 26 and their respective counterpart keys 24. Each pair can be indicated by a different color, or by different indicia on the displays of each pair of keys 24, 26. In another aspect of the invention, a virtual key 26 can be selectively programmed to consecutively emulate the functions of a plurality of keys 22, e.g. similarly to computer "macro."

In this way, the present invention offers ease of use and many other advantages over previous keypad devices.

As described hereinabove, the present invention solves many problems associated with previous type systems. However, it will be appreciated that various changes in the details, materials and arrangements of parts which have been herein described and illustrated in order to explain the nature of the invention may be made by those skilled in the area within the principle and scope of the invention will be expressed in the appended claims.

I claim:

1. A customizable interface comprising:

a user interface including a plurality of actuatable input elements, each input element adapted for association with control of at least one of a plurality of functions of an associated device;

sensing means adapted for sensing actuation of one of the plurality of actuatable elements;

means adapted for receiving selection data representative of a selected subset of the plurality of functions corresponding to a sensed actuation by the sensing means, wherein the selection data is defined by at least one of a commonly used function and a most recently invoked function;

means adapted for associating the selected subset of the plurality of functions with a second of the plurality of actuatable elements such that the selected subset is invoked upon user selection thereof;

means adapted for generating an indicator representative of the selected subset of being associated with the specified input element; and means adapted for communicating data representative of a selected subset of the plurality of functions to the associated device for control thereof.

2. The customizable interface of claim 1, wherein the indicator is comprised of an indicia including at least one of a unique name, symbol and color associated with the specified input element.

3. The customizable interface of claim 2, wherein the specified input element is a virtual key.

4. The customizable interface of claim 3, wherein the virtual key is located apart from the plurality of actuatable input elements.

5. The customizable interface of claim 1, wherein the actuatable input elements are alphanumeric input elements.

6. A computer-readable medium with computer-readable instructions stored thereon for customizable interface comprising:

instructions for a user interface including a plurality of actuatable input elements, each input element adapted for association with control of at least one of a plurality of functions of an associated device;

instructions for sensing actuation of one of the plurality of actuatable elements;

instructions for receiving selection data representative of a selected subset of the plurality of functions corresponding to a sensed actuation by the sensing means, wherein the selection data is defined by at least one of a commonly used function and a most recently invoked function;

instructions for associating the selected subset of the plurality of functions with a second of the plurality of actuatable elements such that the selected subset is invoked;

instructions for generating an indicator representative of the selected subset of being associated with the specified input element; and instructions for communicating data representative of a selected subset of the plurality of functions to the associated device for control thereof.

7. The computer-readable medium with computer-readable instructions stored thereon for a customizable interface of claim 6, wherein the indicator is comprised of an indicia including at least one of a unique name, symbol and color associated with the specified input element.

8. The computer-readable medium with computer-readable instructions stored thereon for a customizable interface of claim 7, wherein the specified input element is a virtual key.

9. The computer-readable medium with computer-readable instructions stored thereon for a customizable interface of claim 8, wherein the virtual key is located apart from the plurality of actuatable input elements.

10. The computer-readable medium with computer-readable instructions stored thereon for a customizable interface of claim 6, wherein the actuatable input elements are alphanumeric input elements.

* * * * *